United States Patent
Nakaguchi et al.

(10) Patent No.: US 11,863,111 B2
(45) Date of Patent: Jan. 2, 2024

(54) POWER SUPPLY CONTROL DEVICE AND POWER SUPPLY CONTROL METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Shinnosuke Nakaguchi, Yokkaichi (JP); Masayuki Kato, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 328 days.

(21) Appl. No.: 17/426,619

(22) PCT Filed: Jan. 14, 2020

(86) PCT No.: PCT/JP2020/000784
§ 371 (c)(1),
(2) Date: Jul. 28, 2021

(87) PCT Pub. No.: WO2020/158358
PCT Pub. Date: Aug. 6, 2020

(65) Prior Publication Data
US 2022/0052631 A1 Feb. 17, 2022

(30) Foreign Application Priority Data
Jan. 29, 2019 (JP) .................. 2019-013440

(51) Int. Cl.
*H02P 7/29* (2016.01)
*G05F 1/56* (2006.01)
*H02P 29/024* (2016.01)

(52) U.S. Cl.
CPC .................. *H02P 7/29* (2013.01); *G05F 1/56* (2013.01); *H02P 29/027* (2013.01)

(58) Field of Classification Search
CPC .......... H02P 7/29; H02P 29/027; H02P 23/14; H02P 29/024; H02P 29/028; G05F 1/56; G05F 1/573
(Continued)

(56) References Cited

U.S. PATENT DOCUMENTS 7,425,809 B2 * 9/2008 Shen .................. H05K 7/20209
318/599
2004/0184206 A1 9/2004 Nomura et al.
(Continued)

FOREIGN PATENT DOCUMENTS

JP 2001-095289 A 4/2001

OTHER PUBLICATIONS

International Search Report, Application No. PCT/JP2020/000784, dated Feb. 18, 2020. ISA/Japan Patent Office.

*Primary Examiner* — David Luo

(57) ABSTRACT

Provided is a power supply control device for controlling power supply to a motor installed in a vehicle, including: a switching element configured to turn on and off the power supply to the motor; a current detection circuit configured to detect a current flowing to the motor; and a control unit configured to determine whether or not the motor is in a locked state based on the current detected by the current detection circuit, and control turning on and off the power supply to the motor at a duty cycle that corresponds to the current detected by the current detection circuit, if it is determined that the motor is in the locked state.

8 Claims, 6 Drawing Sheets

(58) Field of Classification Search
USPC .......................... 318/599, 560; 361/1, 23, 31
See application file for complete search history.

(56) References Cited

U.S. PATENT DOCUMENTS

2009/0224714 A1  9/2009  Serizawa et al.
2011/0110002 A1  5/2011  Ooshima

* cited by examiner

| Average lock current [A] | Duty cycle [%] | A | B |
|---|---|---|---|
| 15 | 50 | 500 | 500 |
| 16 | 48.8 | 488 | 512 |
| 17 | 47.6 | 476 | 524 |
| ... | ... | ... | ... |
| 40 | 20 | 200 | 800 |

Legend
A= On-time [millisecond]
B= Off-time [millisecond]

POWER SUPPLY CONTROL DEVICE AND POWER SUPPLY CONTROL METHOD

CROSS-REFERENCE TO RELATED APPLICATIONS

This application is the U.S. national stage of PCT/JP2020/000784 filed on Jan. 14, 2020, which claims priority of Japanese Patent Application No. JP 2019-013440 filed on Jan. 29, 2019, the contents of which are incorporated herein.

TECHNICAL FIELD

The present disclosure relates to a power supply control device and a power supply control method.

BACKGROUND

Vehicles are provided with a power supply control device for controlling power supply from an in-vehicle battery to a load. An example of the load is a motor that drives a windshield wiper. The power supply control device includes a switching element such as a power MOSFET (Metal Oxide Semiconductor Field Effect Transistor) that is connected to a power supply path, and activates the windshield wiper by turning the switching element on.

The power supply control device monitors the states of the power supply path and the motor, and performs control for interrupting the power supply path. The states of the power supply path and the motor include four states, namely, a short-circuit failure state in which the power supply path is short-circuited, an open-circuit failure state in which the power supply path is open-circuited, a locked state in which the motor is inoperative, and a normal state. The locked state refers to a state in which the windshield wiper is locked, adhered, frozen, or constrained for some reason. The locked state includes not only a state in which the motor does not move at all but also a state in which the operation of the motor is restricted to such an extent that the function of the windshield wiper cannot be fulfilled. For example, if snow has piled up on the windshield of the vehicle, the windshield wiper cannot move under the weight of the snow, and the motor is in the locked state.

Particularly in the short-circuit failure state or the open-circuit failure state, the power supply control device turns off the switching element to interrupt the power supply path. This is to protect the motor and the power supply control device from an overcurrent. In the open-circuit failure state, an electric wire connected to the in-vehicle battery may have come loose from the motor, or broken, and it is dangerous if this electric wire comes into contact with the vehicle frame or the like, and thus the power supply control device turns off the switching element.

JP 2009-171728A discloses a technique in which it is determined whether or not a load is in a locked state based on voltages at both ends of an FET serving as a semiconductor relay, and if it is determined that the load is in the locked state, a switching element is turned on and off at a constant period to resolve the locked stat.

The power supply device disclosed in JP 2009-171728A is configured to turn a switching element on and off at a constant period regardless of the magnitude of the current in a locked state, and thus has the problem that it is not possible to efficiently resolve the locked state. To reduce heat generated by a lock current and safely drive the motor, it is necessary to set short on-time, but there are cases where a lock current is small depending on the locked state. In this case, an operation in which the switching element is on for a short period of time with a small torque will be repeated, thus taking a long time to resolve the locked state.

SUMMARY

It is an object of the present disclosure to provide a power supply control device and a power supply control method that can efficiently resolve a locked state of a motor.

According to the present disclosure, a power supply control device for controlling power supply to a motor installed in a vehicle includes: a switching element configured to turn on and off the power supply to the motor; a current detection circuit configured to detect a current flowing to the motor; a table in which a plurality of currents having different magnitudes are respectively associated with duty cycles and a control unit configured to determine whether or not the motor is in a locked state based on the current detected by the current detection circuit, and control turning on and off the power supply to the motor at a duty cycle that corresponds to the current detected by the current detection circuit, if it is determined that the motor is in the locked state, wherein the duty cycles in the table are set such that heat generated by the motor is suppressed while the power supply to the motor is turned on and off, and the duty cycles in the table are set such that if, when each of the plurality of currents flows to the motor, the power supply is controlled with an on-period that is longer than an on-period indicated by the duty cycle associated with the corresponding current, a temperature of the motor increases.

According to the present disclosure, a power supply control method for controlling power supply to a motor installed in a vehicle includes the steps of detecting a current flowing to the motor; determining whether or not the motor is in a locked state based on the detected current; and if it is determined that the motor is in the locked state, controlling turning on and off the power supply to the motor at a duty cycle that corresponds to the detected current.

Advantageous Effects of Invention

According to the present disclosure, it is possible to provide a power supply control device and a power supply control method that can efficiently resolve a locked state of a motor.

DESCRIPTION OF PREFERRED EMBODIMENTS

Figure 1:
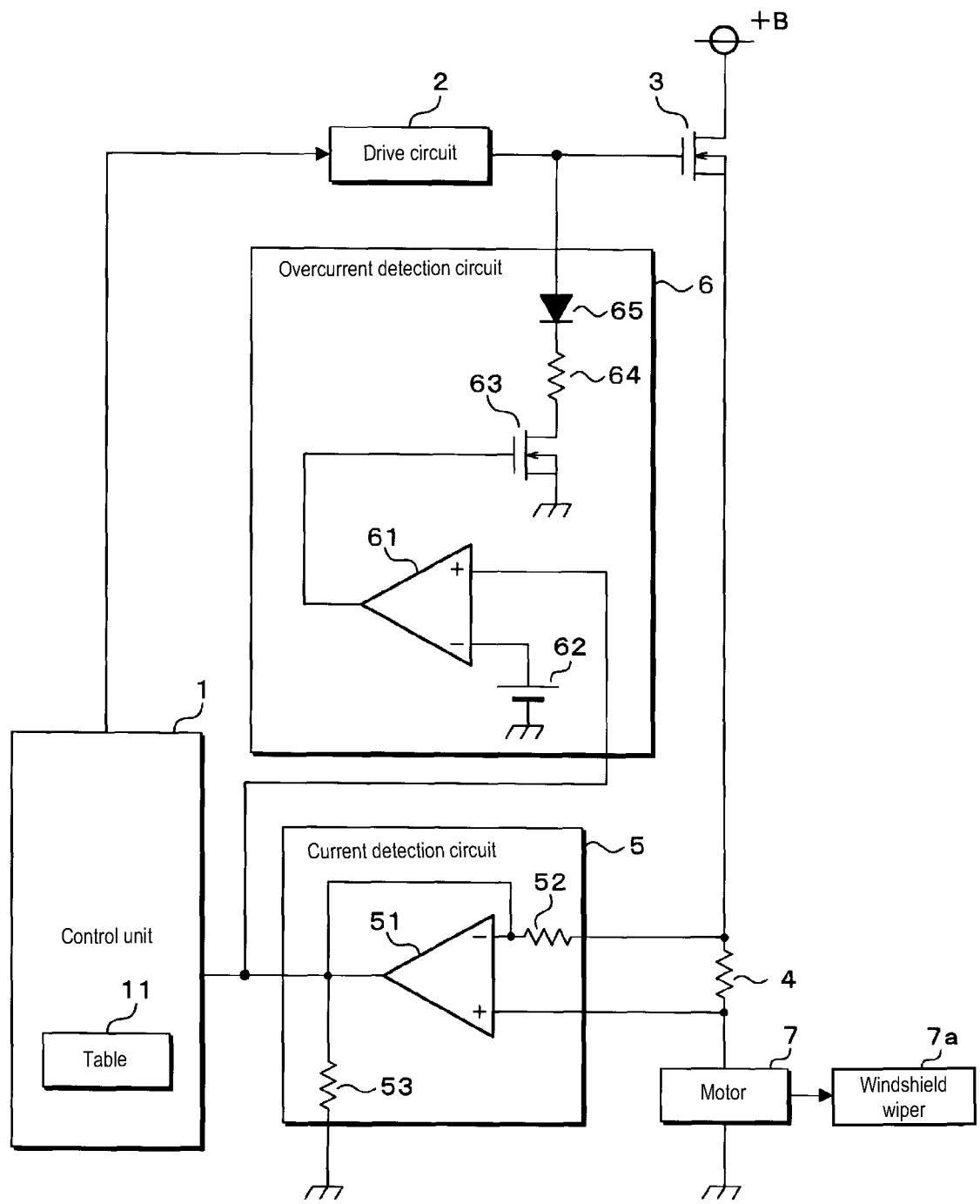
FIG. 1 is a circuit block diagram illustrating an example of a configuration of a power supply control device according to an embodiment.

First, embodiments of the present disclosure will be listed and described. Also, at least some of the embodiments described below may be combined with each other as appropriate.

According to an aspect, a power supply control device for controlling power supply to a motor installed in a vehicle includes: a switching element configured to turn on and off the power supply to the motor; a current detection circuit configured to detect a current flowing to the motor; and a control unit configured to determine whether or not the motor is in a locked state based on the current detected by the current detection circuit, and control turning on and off the power supply to the motor at a duty cycle that corresponds to the current detected by the current detection circuit, if it is determined that the motor is in the locked state.

With this aspect, when the motor is in the locked state, the control unit controls the switching element so as to be turned on and off at the duty cycle that corresponds to the current flowing to the motor. Accordingly, it is possible to change the drive time of the motor according to the magnitude of the current of the motor, and thus it is possible to efficiently resolve the locked state of the motor.

As a preferable configuration, the duty cycle is set such that the smaller the current detected by the current detection circuit is, the longer on-time of the switching element is.

With this aspect, the control unit controls the switching element so as to be turned on and off such that the smaller the current flowing to the motor is, the longer the on-time of the switching element is. Accordingly, the drive time of the motor can be made longer the smaller the current flowing to the motor is, and thus it is possible to efficiently resolve the locked state of the motor. Also, by setting shorter drive time of the motor the larger the current flowing to the motor is, it is possible to suppress heat generated by the motor.

As a preferable configuration, the duty cycle is set such that heat generated by the motor is suppressed while the power supply to the motor is turned on and off.

With this aspect, even if the motor is in the locked state, the control unit controls the switching element so as to be turned on and off at a duty cycle such that the heat generated by the motor is suppressed. By suppressing the heat generated by the motor, it is possible to suppress a decrease in the current flowing to the motor. Because the torque of the motor is proportional to the current flowing to the motor, suppressing the heat generated by the motor can prevent a reduction in the torque of the motor. Accordingly, it is possible to turn the switching element on and off while maintaining the torque of the motor, and efficiently resolve the locked state of the motor.

As a preferable configuration, the duty cycle is set such that a torque of the motor is not reduced while the power supply to the motor is turned on and off.

With this aspect, even if the motor is in the locked state, the control unit controls the switching element so as to be turned on and off at a duty cycle such that the torque of the motor is not reduced. Accordingly, it is possible to turn the switching element on and off while maintaining the torque of the motor, and efficiently resolve the locked state of the motor.

As a preferable configuration, the power supply control device further includes a table in which a plurality of currents having different magnitudes are respectively associated with duty cycles, wherein the duty cycles in the table are set such that if, when each of the plurality of currents flows to the motor, the power supply is controlled with an on-period that is longer than an on-period indicated by the duty cycle associated with the corresponding current, a temperature of the motor increases.

With this aspect, if the motor is in the locked state, the control unit references the table, and controls turning on and off the switching element at the duty cycle associated with the current flowing to the motor. Duty cycles in the table are set to values with which the temperature of the motor does not increase due to on/off control, that is, values with which the torque of the motor is not reduced. Accordingly, it is possible to turn the switching element on and off while maintaining a state in which the torque of the motor is at the maximum, and efficiently resolve the locked state of the motor.

As a preferable configuration, the duty cycles in the table are set such that the torque of the motor is not reduced and the on-time of the switching element is the longest, at a predetermined ambient temperature in which the motor is used.

With this aspect, it is possible to turn the switching element on and off while maintaining a state in which the drive time of the motor is long and the torque of the motor is at the maximum, thus making it possible to efficiently resolve the locked state of the motor.

As a preferable configuration, the current detection circuit includes a shunt resistor connected in series to the switching element.

With this aspect, since the power supply control device is configured to detect a current using the shunt resistor, it is possible to accurately detect the magnitude of the current. Accordingly, the control unit can appropriately control turning on and off of the switching element, and it is possible to efficiently resolve the locked state of the motor.

As a preferable configuration, the control unit controls the switching element so as to be turned off if the current detected by the current detection circuit is greater than or equal to a first threshold or is less than or equal to a second threshold, and the control unit determines that the motor is in the locked state if the current is within a predetermined range between the first threshold and the second threshold.

With this aspect, if the current of the motor is greater than or equal to the first threshold, that is, if the motor is in the short-circuit failure state, the control unit controls the switching element so as to be turned off, and interrupts the power supply path. Also, if the current of the motor is less than or equal to the second threshold, that is, if the motor is in the open-circuit failure state, the control unit controls the switching element so as to be turned off, and interrupts the power supply path. Furthermore, if the current of the motor is in the predetermined range between the first threshold and the second threshold, the control unit determines that the motor is in the locked state. Accordingly, the control unit can determine whether the motor is in a state in which it is possible to resolve the locked state, or in a dangerous failure state such as that of a short-circuit failure or an open-circuit failure, and the control unit can control the switching element so as to be turned on and off upon confirming that the motor is in a safe state.

As a preferable configuration, the control unit controls the power supply to the motor that drives a windshield wiper provided in the vehicle.

With this aspect, by performing on/off control on the switching element, it is possible to efficiently resolve the locked state of the windshield wiper.

According to an aspect, a power supply control method for controlling power supply to a motor installed in a vehicle includes the steps of detecting a current flowing to the motor; determining whether or not the motor is in a locked state based on the detected current; and if it is determined that the motor is in the locked state, controlling turning on and off the power supply to the motor at a duty cycle that corresponds to the detected current.

With this aspect, it is possible to change the drive time of the motor while suppressing the heat generated by the motor, and efficiently resolve the locked state of the motor.

The following will describe specific examples of the power supply control device and the power supply control method according to embodiments of the present disclosure with reference to the drawings. Note that the present disclosure is not limited to the examples but is defined by the claims, and all modifications within the meaning and scope equivalent to the claims are intended to be included.

The following will specifically describe the present disclosure with reference to the drawings showing an embodiment thereof.

FIG. 1 is a circuit block diagram illustrating an example of a configuration of the power supply control device according to an embodiment. The power supply control device of the embodiment is a device that controls power supply from an unshown in-vehicle battery to a motor 7 for driving a windshield wiper 7a. The power supply control device includes a control unit 1, a drive circuit 2, a switching element 3, a shunt resistor 4, a current detection circuit 5, and an overcurrent detection circuit 6.

The switching element 3 is an N-channel power MOSFET, for example. The drain of the switching element 3 is connected to the plus terminal of the in-vehicle battery, and the source of the switching element 3 is connected to the plus terminal of the motor 7. The minus terminal of the in-vehicle battery and the minus terminal of the motor 7 are grounded.

The drive circuit 2 is connected to the gate of the switching element 3. The drive circuit 2 drives and turns on the switching element 3 by stepping up the voltage of the gate of the switching element 3 relative to the ground potential.

The current detection circuit 5 is a circuit that detects a current flowing through the shunt resistor 4, that is, a current flowing to the motor 7, by detecting voltages at both ends of the shunt resistor 4, and outputs the voltage that corresponds to the detected current to the control unit 1.

An example of the current detection circuit 5 is described. The current detection circuit 5 includes a differential amplifier 51, and constitutes an inverting amplifier circuit. The non-inverting input terminal of the differential amplifier 51 is connected to the minus terminal of the shunt resistor 4. The inverting input terminal of the differential amplifier 51 is connected to the plus terminal of the shunt resistor 4 via an electric resistor 52. The output terminal of the differential amplifier 51 is grounded via an electric resistor 53. The output terminal of the differential amplifier 51 is also connected to the inverting input terminal, and realizes a negative feedback.

The overcurrent detection circuit 6 is a circuit that performs control such that the switching element 3 is turned off if an overcurrent flows to the motor 7.

An example of the overcurrent detection circuit 6 is described. The overcurrent detection circuit 6 includes a differential amplifier 61. The inverting input terminal of the differential amplifier 61 is connected to a reference voltage source 62, which outputs a reference voltage for use in determining whether or not an overcurrent is flowing to the motor 7. The output terminal of the current detection circuit 5 is connected to the non-inverting input terminal of the differential amplifier 61. The output terminal of the differential amplifier 61 is connected to the gate of an interruption switching element 63. The source of the interruption switching element 63 is grounded. The drain of the interruption switching element 63 is connected to one end portion of a resistor 64, and the other end portion of the resistor 64 is connected to the cathode of a diode 65. The anode of the diode 65 is connected to the gate of the switching element 3.

The differential amplifier 61 compares a voltage output from the current detection circuit 5 with the reference voltage. That is to say, the differential amplifier 61 compares a current flowing to the motor 7 with a predetermined current that corresponds to the reference voltage. If the voltage output from the current detection circuit 5 is greater than the reference voltage, the differential amplifier 61 turns the interruption switching element 63 on. That is to say, if an overcurrent is flowing to the motor 7, the interruption switching element 63 is turned on. When the interruption switching element 63 is turned on, the switching element 3 is turned off, and the power supply path is interrupted.

Figures 2, 3:
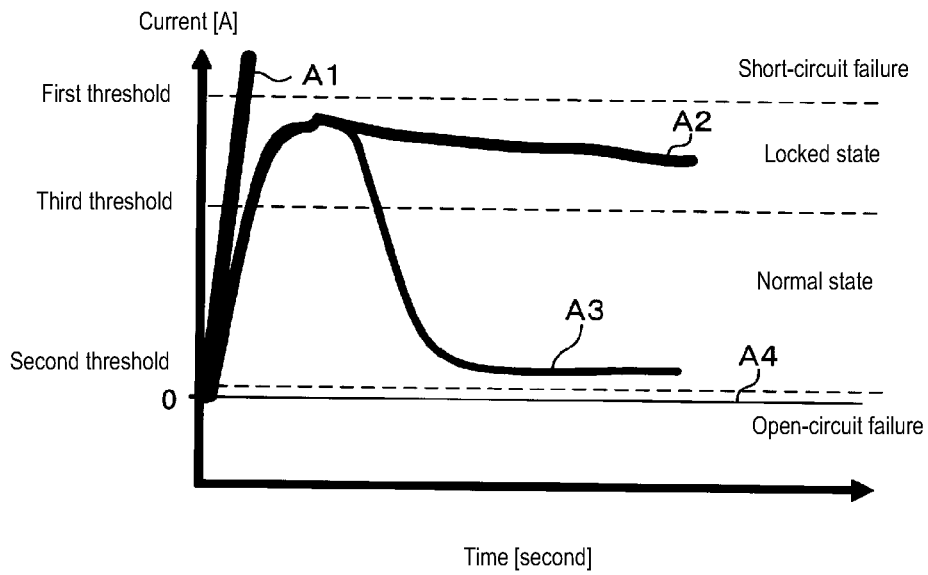
FIG. 2 is a graph illustrating relationships between the states and currents of a motor.
FIG. 3 is a conceptual diagram illustrating an example of a configuration of a table.

The control unit 1 stores a first threshold, a second threshold, and a third threshold for use when the state of the motor 7 is determined based on a current flowing to the motor 7 (see FIG. 2). Also, the control unit 1 includes a table 11 for use in executing switching control based on the current flowing to the motor 7 when the motor 7 is in a locked state.

FIG. 2 is a graph illustrating relationships between the states and currents of the motor 7. The horizontal axis indicates time, and the vertical axis indicates the current flowing to the motor 7.

The first threshold is a threshold for use in determining whether or not the motor 7 or a circuit involved in power supply has a short circuit failure. If, as indicated by a curve A1, the current flowing to the motor 7 is greater than or equal to the first threshold after a predetermined period of time has elapsed from when the switching element 3 was turned on, the control unit 1 determines that a short circuit failure has occurred.

The second threshold is a threshold for use in determining whether or not the motor 7 or the circuit involved in power supply has an open circuit failure. If, as indicated by a curve A4, the current flowing to the motor 7 is less than or equal to the second threshold after a predetermined period of time has elapsed from when the switching element 3 was turned on, the control unit 1 determines that an open circuit failure has occurred. The second threshold is less than the first threshold.

The third threshold is a threshold for use in determining whether or not the motor 7 is in the locked state. The third threshold is greater than the second threshold, and is less than the first threshold. If, as indicated by a curve A2, the current flowing to the motor 7 is greater than or equal to the third threshold and is less than the first threshold after a predetermined period of time has elapsed from when the switching element 3 was turned on, the control unit 1 determines that the motor 7 is in the locked state. If, as indicated by a curve A3, the current flowing to the motor 7 is greater than the second threshold and is less than the third threshold after a predetermined period of time has elapsed from when the switching element 3 was turned on, the control unit 1 determines that the motor 7 is in the normal state.

FIG. 3 is a conceptual diagram illustrating an example of a configuration of the table 11. The table 11 indicates the correspondence between currents flowing to the motor 7 that is in the locked state, and duty cycles of the switching element 3. To efficiently resolve the locked state of the motor 7, the switching element 3 needs to be turned on and off at an appropriate duty cycle that corresponds to the current. The duty cycle is set at least such that the smaller the current flowing to the motor 7 is, the longer the on-time of the switching element 3 is. It is preferable that the duty cycle be set in a range from 20% to 80% inclusive. For example, the duty cycle is set to 50[%] when the current is small, and is set to 20[%] when the current is large. Preferably, the duty cycle is set such that the torque is not reduced due to heat generated by the motor 7 while the power supply to the motor 7 is turned on and off. Preferable duty cycles will be described in detail later.

The period in which the switching element 3 is turned on/off is from 0.5 to 3 seconds inclusive. In the present embodiment, a description is given assuming that the period in which the switching element 3 is turned on/off is 1 second. When the period is 1 second and the duty cycle is 50[%], the control unit 1 performs control such that the switching element 3 is on for 500 milliseconds, and is then off for 500 milliseconds.

Figure 4:
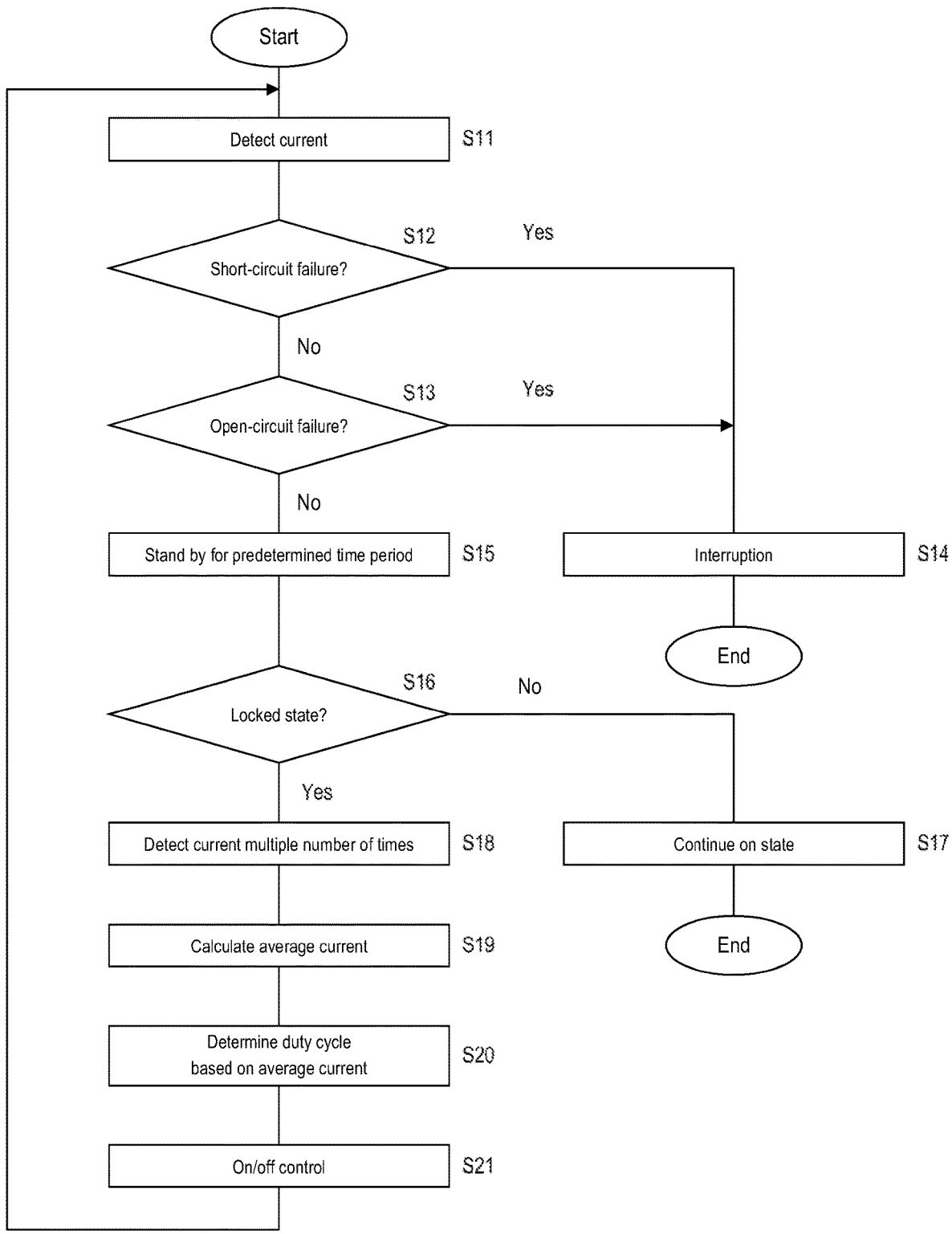
FIG. 4 is a flowchart illustrating a processing procedure of power supply control.
Figure 5:
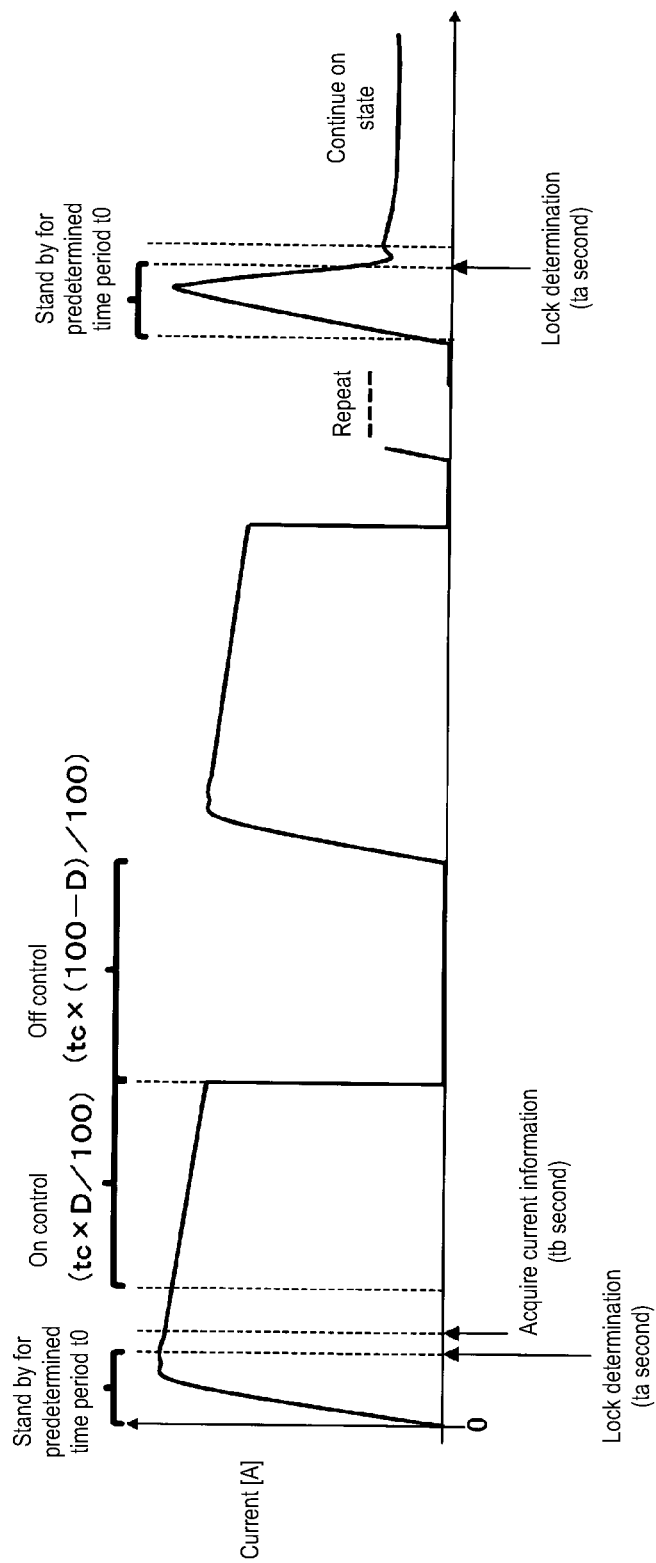
FIG. 5 is a timing chart illustrating a power supply control method.

FIG. 4 is a flowchart illustrating a processing procedure of the power supply control, and FIG. 5 is a timing chart showing a power supply control method. In FIG. 5, the horizontal axis indicates time, and the vertical axis indicates the current flowing to the motor 7. In a state in which the windshield wiper 7a is activated and a current flows to the motor 7, the control unit 1 executes the following processing. The control unit 1 detects a current flowing to the motor 7 using the current detection circuit 5 (step S11).

Then, the control unit 1 determines whether or not a short-circuit failure has occurred, based on the detected current (step S12). Specifically, the control unit 1 determines whether or not the current detected in step S11 is greater than or equal to the first threshold.

If it is determined that no short-circuit failure has occurred (No in step S12), the control unit 1 determines whether or not an open-circuit failure has occurred, based on the detected current (step S13). Specifically, the control unit 1 determines whether or not the current detected in step S11 is less than or equal to the second threshold.

If it is determined that a short-circuit failure has occurred (Yes in step S12), or it is determined that an open-circuit failure has occurred (Yes in step S13), the control unit 1 controls the switching element 3 so as to be turned off, and interrupts the power supply path (step S14), thereby ending the processing.

If it is determined that no open-circuit failure has occurred (No in step S13), the control unit 1 stands by for a predetermined time period t0 (step S15). The predetermined time period t0 is, for example, about 10 milliseconds. The predetermined time period t0 is a time period that is longer than or equal to a transition time period until the value of the current returns to the value that corresponds to the state of the motor 7 after the switching element 3 has been turned on.

When the predetermined time period t0 has elapsed, the control unit 1 determines whether or not the motor 7 is in the locked state, based on the current detected by the current detection circuit 5 (step S16). Specifically, the control unit 1 determines whether or not the current flowing to the motor 7 is greater than or equal to the third threshold, and is less than the first threshold. The current for use in determining whether or not the motor 7 is in the locked state needs only to be detected for a short time period ta. Specifically, it is sufficient that the current detection circuit 5 detects a current only once. The time period to is as long as one clock of the control unit 1, e.g., 5 milliseconds.

If it is determined that the motor 7 is not in the locked state (No in step S16), the control unit 1 controls the switching element 3 so as to continue to be on (step S17), and ends the processing.

If it is determined that the motor 7 is in the locked state (Yes in step S16), the control unit 1 detects a current using the current detection circuit 5 a multiple number of times during a time period tb (step S18), and calculates the average of the currents flowing to the motor 7 (step S19). The time period tb is as long as four clocks of the control unit 1, e.g., 20 milliseconds.

Then, the control unit 1 references the table 11, and determines the duty cycle that corresponds to the average current (step S20). Then, the control unit 1 controls the switching element 3 so as to be turned on and off at the determined duty cycle (step S21), and returns to the processing in step S11. Specifically, as shown in FIG. 5, assuming that the duty cycle D=on-time/off-time [%], the control unit 1 controls the switching element 3 so as to be on for tc*D/100 seconds, then controls the switching element 3 so as to be off for tc*(100−D)/100, and controls the switching element 3 to be on again.

Figure 6A:
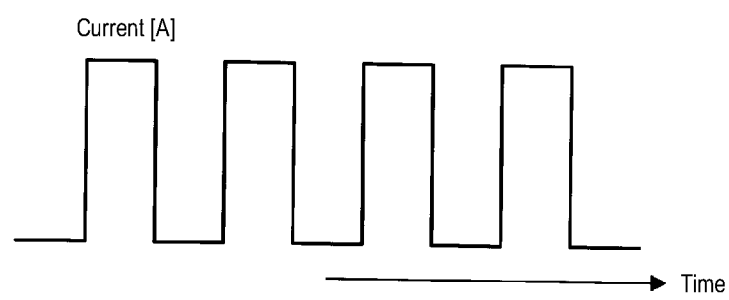
FIG. 6A is a diagram illustrating an on/off control method based on an average current in a locked state.
Figure 6B:
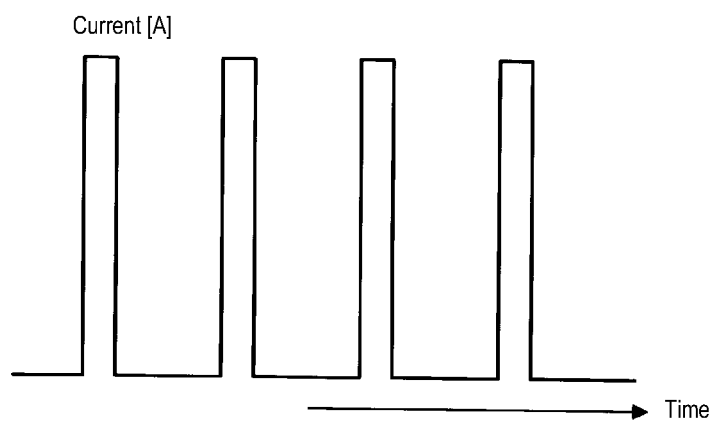
FIG. 6B is a diagram illustrating an on/off control method based on an average current in the locked state.

FIGS. 6A and 6B are diagrams illustrating an on/off control method based on an average current in the locked state. FIG. 6A shows the on/off state of the switching element 3 when the average current of the motor 7 is small, and FIG. 6B shows the on/off state of the switching element 3 when the average current of the motor 7 is large. As shown in FIGS. 6A and 6B, the control unit 1 controls the switching element 3 so as to be turned on and off at a larger duty cycle the smaller the average current of the motor 7 is. Accordingly, when the current flowing to the motor 7 is small, the drive time of the motor 7 can be prolonged, and it is thus possible to efficiently resolve the locked state of the motor 7. Also, when the current flowing to the motor 7 is large, the drive time of the motor 7 can be shortened, thereby suppressing the heat generated by the motor 7.

Figure 7A:
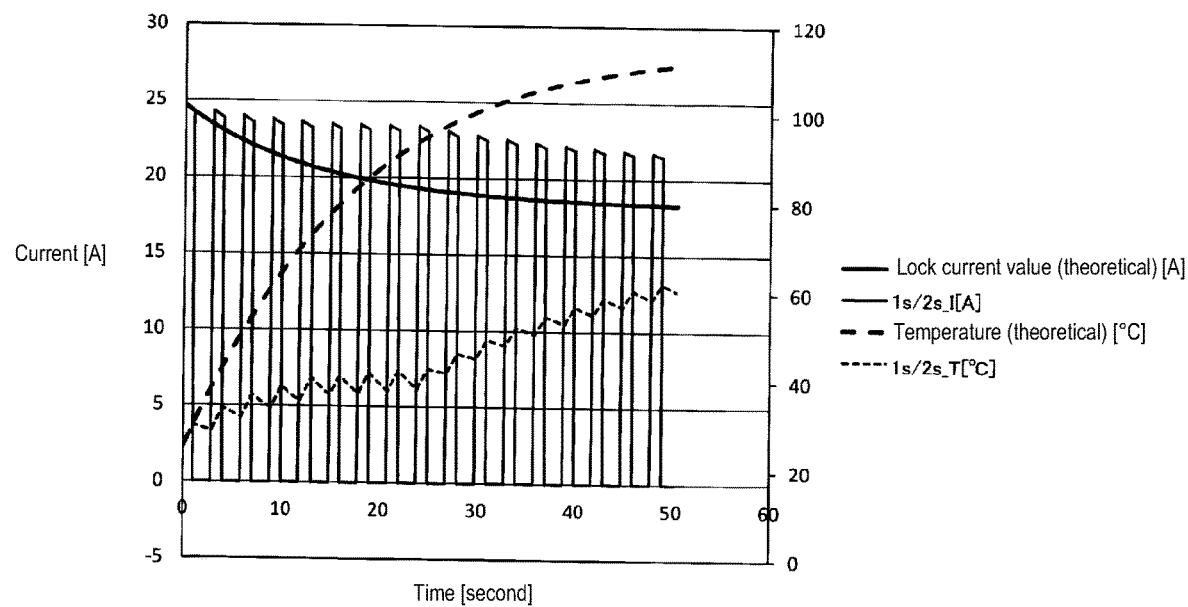
FIG. 7A is a graph of simulation results illustrating a duty cycle at which it is possible to maintain the maximum torque.
Figure 7B:
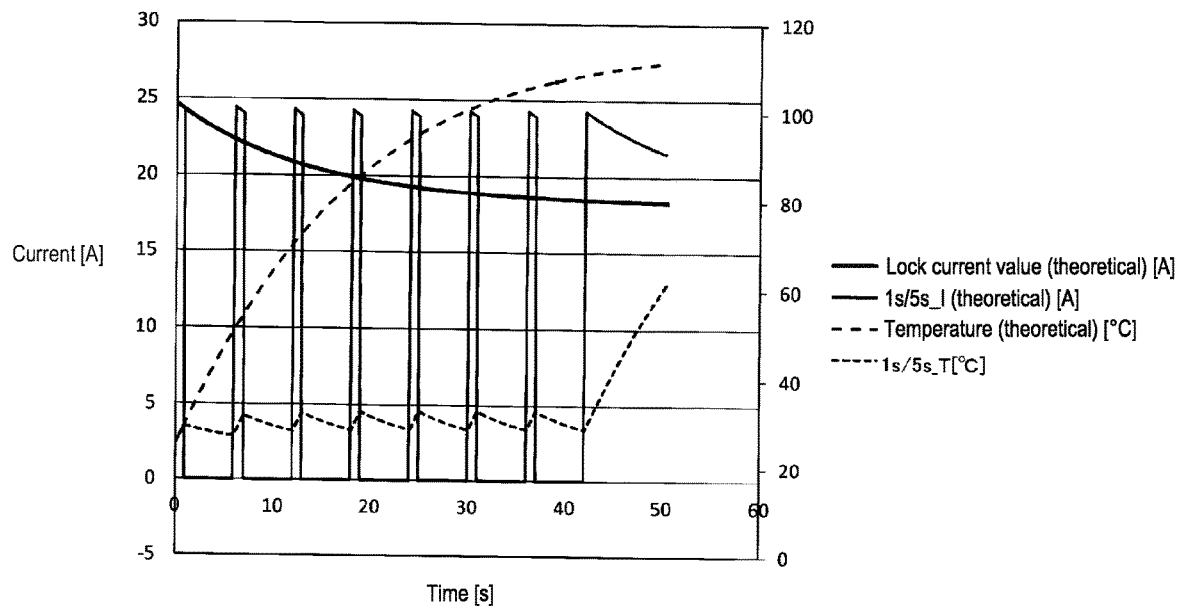
FIG. 7B is a graph of simulation results illustrating a duty cycle at which it is possible to maintain the maximum torque.

FIGS. 7A and 7B are graphs of simulation results illustrating the duty cycle at which it is possible to maintain the maximum torque. The horizontal axis indicates time, the vertical axis on the left side indicates the current, and the vertical axis on the right side indicates the temperature of the motor 7. FIG. 7A shows a state in which the duty cycle is excessively large, and FIG. 7B shows a state in which the duty cycle is appropriate. The simulation results shown in FIGS. 7A and 7B were obtained by calculating the resistance of a motor coil, the length of the motor coil, the surface area of the coil, the mass of the coil, and the thermal capacity of the motor based on the average of currents flowing to the motor 7, combining the heat generation amount and the heat discharge amount, and obtaining the increase in the temperature of the motor 7 and the decrease in the flowing current. The conditions of the simulation were as follows: the temperature of the motor 7 in the initial state was set to 25° C., and the average current was set to 25 [A]. A circumflex denotes exponentiation. T denotes a temperature.

Applied voltage: $V_a(=12)[V]$

Copper resistance: $\rho(=1.5475+0.0068725T) \times 10^{(-8)} [\Omega \cdot m]$

Coil wire diameter: $a(=1)[mm]$

Copper density: $\rho cu(=8.94)[g/cm^3]$
Specific heat: $A(=0.379)[J/g\cdot K]$
Coefficient of heat transfer: $\lambda(=10)[W/m^2\cdot K]$
Boltzmann constant: $K(=5.67\times10^{(\sim8)})[W/(m^2K^4)]$
Enamel emissivity: $E(=0.37)$ As is clear from FIGS. 7A and 7B, a long time period in which the motor 7 is on is not always preferable. In the graphs of FIGS. 7A and 7B, thick lines indicate a change in current flowing to the motor 7 when the switching element 3 is kept on, and thick dotted lines indicate the temperature of the motor coil. When a current flows to the motor 7, the temperature increases and the current decreases. Because the torque of the motor 7 is proportional to the current, the torque of the motor 7 is reduced.

As shown in FIG. 7A, if the on-time is long, the temperature of the motor 7 will increase. When the temperature of the motor 7 increases, the current flowing to the motor 7 decreases, resulting in a reduced torque. FIG. 7A shows this state.

As shown in FIG. 7B, if the duty cycle is appropriate, an increase in the temperature of the motor 7 can be suppressed even when the on/off control is continued, and it is thus possible to keep the torque of the motor 7 high.

Preferably, the table 11 stores duty cycles at which an increase in the temperature of the motor 7 can be suppressed, or duty cycles at which the torque of the motor 7 is not reduced, as shown in the graph of FIG. 7B. More preferably, the duty cycles stored in the table 11 are set to values such that if power supply is controlled with an on-period that is longer than the on-periods indicated by the duty cycles corresponding to the currents stored in the table 11, the temperature of the motor 7 increases as shown in FIG. 7A. That is to say, the duty cycles are preferably set to values with which the on-time of the motor is the longest without reducing the torque of the motor 7 at a predetermined ambient temperature at which the motor 7 is used. In other words, it can be said that it is preferable to register duty cycles in association with a plurality of current values, the duty cycles being set such that if a predetermined ambient temperature is suitably set, and a time period longer than the on-time indicated by the duty cycle associated with each of the current values registered in the table 11 is set, the temperature of the motor 7 increases and the torque of the motor 7 decreases.

Note that the longest on-time is not a theoretical value, and thus there is no exact boundary between the on-time in which the temperature of the motor 7 does not increase, and the temperature at which the temperature of the motor 7 starts to increase, and tolerance should be permitted to some extent due to the use environment of the motor 7 and other reasons.

With the power supply control device according to the embodiment having the above-described configurations, it is possible to efficiently resolve the locked state of the motor 7.

Also, longer drive time of the motor 7 can be set the smaller the current flowing to the motor 7 is, and it is thus possible to efficiently resolve the locked state of the motor 7. Also, by setting shorter drive time of the motor 7 the larger the current flowing to the motor 7 is, it is possible to suppress heat generated by the motor 7.

Furthermore, it is possible to turn the switching element 3 on and off while maintaining a state in which the torque of the motor 7 is at the maximum, and efficiently resolve the locked state of the motor 7.

Moreover, since the power supply control device is configured to detect a current using the shunt resistor 4, it is possible to accurately detect a current compared to a configuration in which a current is detected based on the voltages at both ends of the switching element 3. Accordingly, the control unit 1 can appropriately control turning on and off of the switching element 3, and it is possible to efficiently resolve the locked state of the motor 7.

Moreover, in the present embodiment, especially, it is possible to resolve the locked state of the windshield wiper 7a provided in the vehicle.

The invention claimed is:

1. A power supply control device for controlling power supply to a motor installed in a vehicle, comprising:
   a switching element configured to turn on and off the power supply to the motor;
   a current detection circuit configured to detect a current flowing to the motor;
   a table in which a plurality of currents having different magnitudes are respectively associated with duty cycles; and
   a control unit configured to determine whether or not the motor is in a locked state based on the current detected by the current detection circuit, and control turning on and off the power supply to the motor at the duty cycle that corresponds to the current detected by the current detection circuit, if it is determined that the motor is in the locked state,
   wherein the duty cycles in the table are set such that heat generated by the motor is suppressed while the power supply to the motor is turned on and off, and
   the duty cycles in the table are set such that if, when each of the plurality of currents flows to the motor, the power supply is controlled with an on-period that is longer than an on-period indicated by the duty cycle associated with the corresponding current, a temperature of the motor increases.

2. The power supply control device according to claim 1, wherein the duty cycle is set such that the smaller the current detected by the current detection circuit is, the longer the on-time of the switching element is.

3. The power supply control device according to claim 1, wherein the duty cycle is set such that a torque of the motor is not reduced while the power supply to the motor is turned on and off.

4. The power supply control device according to claim 1, wherein the duty cycles in the table are set such that the torque of the motor is not reduced and the on-time of the switching element is the longest, at a predetermined ambient temperature in which the motor is used.

5. The power supply control device according to claim 1, wherein the current detection circuit includes a shunt resistor connected in series to the switching element.

6. The power supply control device according to claim 1, wherein the control unit performs control such that the switching element is turned off if the current detected by the current detection circuit is greater than or equal to a first threshold or is less than or equal to a second threshold, and the control unit determines that the motor is in the locked state if the current is within a predetermined range between the first threshold and the second threshold.

7. The power supply control device according to claim 1, wherein the control unit controls the power supply to the motor that drives a windshield wiper provided in the vehicle.

8. A power supply control method for controlling power supply to a motor installed in a vehicle, comprising the steps of:
   detecting a current flowing to the motor;

determining whether or not the motor is in a locked state based on the detected current; and if it is determined that the motor is in the locked state, referencing a table in which a plurality of currents having different magnitudes are respectively associated with duty cycles, and controlling turning on and off the power supply to the motor at the duty cycle that corresponds to the detected current, wherein the duty cycles in the table are set such that heat generated by the motor is suppressed while the power supply to the motor is turned on and off, and the duty cycles in the table are set such that if, when each of the plurality of currents flows to the motor, the power supply is controlled with an on-period that is longer than an on-period indicated by the duty cycle associated with the corresponding current, a temperature of the motor increases.

* * * * *